Aug. 23, 1949.  J. E. AYRES  2,479,664
STEAM GENERATION
Filed April 4, 1945  3 Sheets-Sheet 1
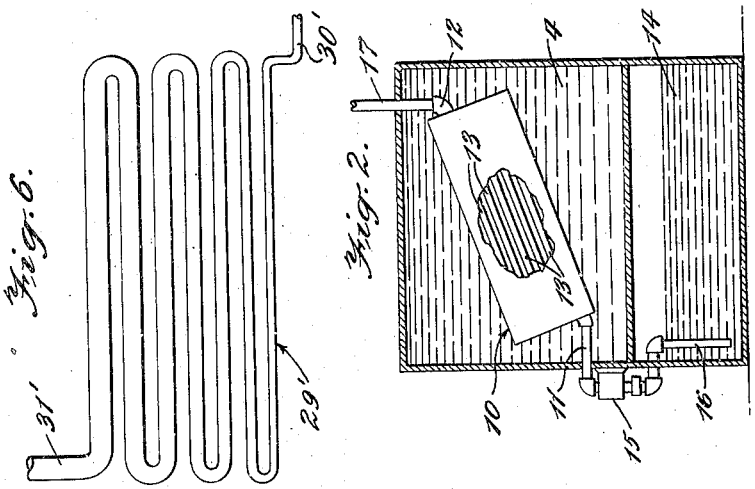
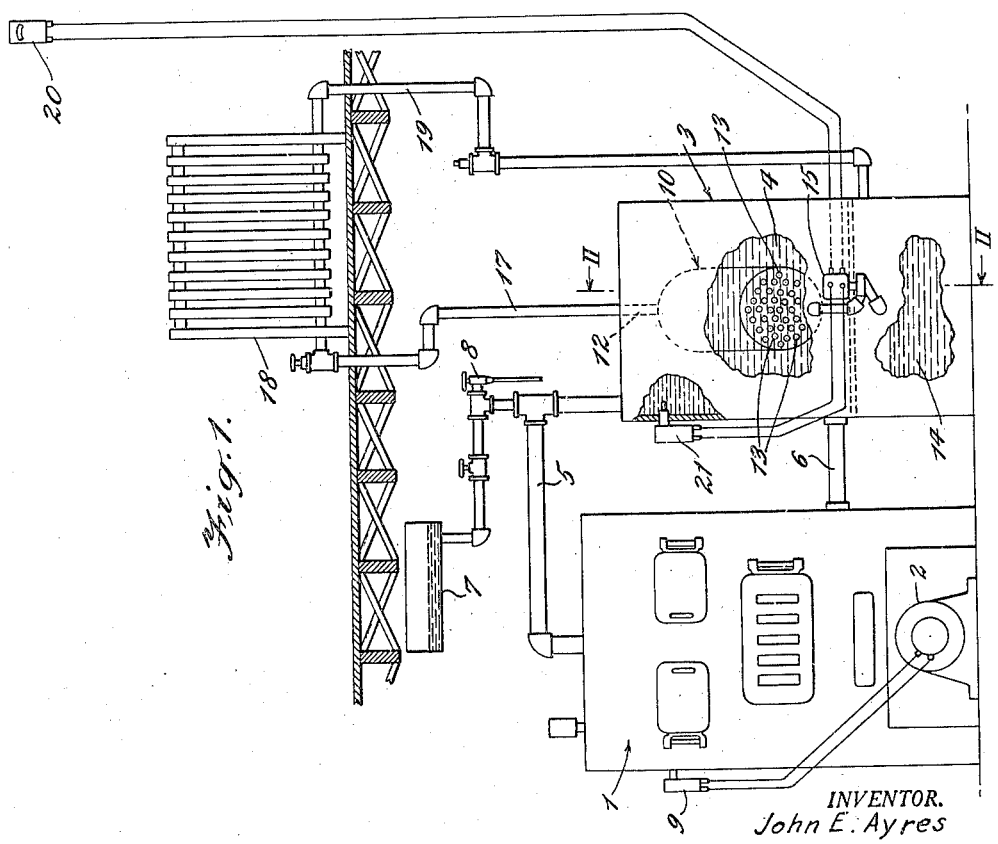
INVENTOR.
John E. Ayres
BY
Burgess Ryan & Hicks
ATTORNEYS

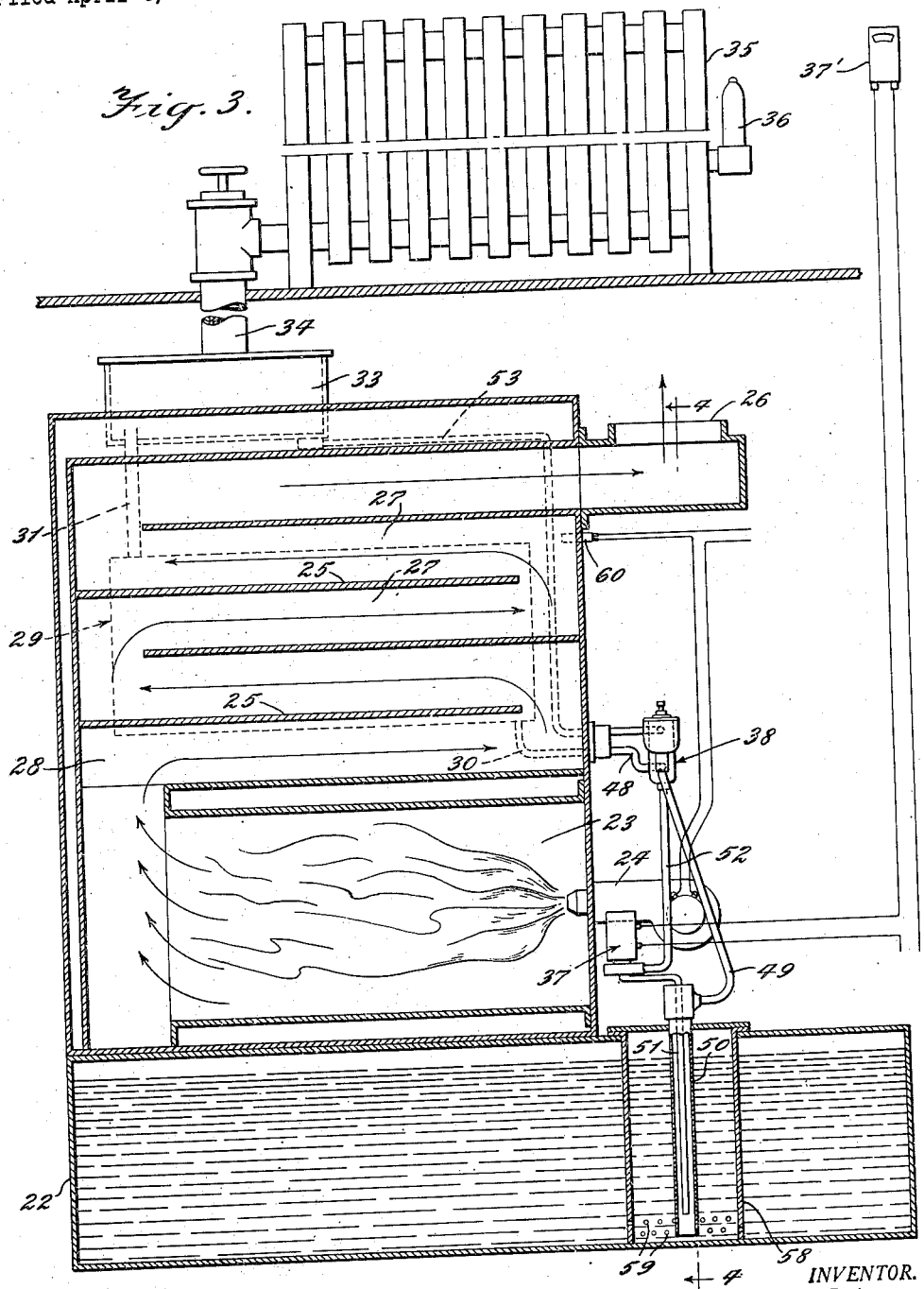

Aug. 23, 1949.                J. E. AYRES                 2,479,664
                            STEAM GENERATION
Filed April 4, 1945                                  3 Sheets-Sheet 3

INVENTOR.
John E. Ayres
BY
Burgess Lyman & Hicks
ATTORNEYS

Patented Aug. 23, 1949

2,479,664

UNITED STATES PATENT OFFICE 2,479,664

STEAM GENERATION

John E. Ayres, Elizabeth, N. J.

Application April 4, 1945, Serial No. 586,461

8 Claims. (Cl. 237—9)

This invention relates to a heating system and has for its primary object to minimize the customary time lag between the call for heat and its delivery and also the usual over-run at the conclusion of the call for heat, all to the end of efficiency in the provision of closer control over the heat output of the system. Additional objects and advantages of the invention will later be apparent.

This application is a continuation-in-part of abandoned application Serial No. 544,899, filed July 14, 1944.

While the invention is applicable to any type of system in which some form of what for convenience will be referred to as a heater unit is required to be supplied intermittently with steam or other heat-vaporized liquid to maintain the output of the unit in accordance with the demands upon it, the invention is of particular utility and is herein illustrated and described in its application to domestic or home-heating installations, in which the heater unit is an ordinary radiator.

In its more general aspects the invention contemplates the use of any appropriate heat-storage medium which is maintained at a predetermined minimum temperature independently of the output demands upon the system, a normally empty vapor generator in heat exchange relation to the heat-storage medium, and means operating intermittently and in immediate accordance with the output demands to supply to the generator a liquid adapted to be vaporized by the maintained temperature of the heat-storage medium. As will presently be apparent, the fact that a vapor-generating temperature is maintained in the heat-storage medium independently of the output demands upon the system, and the fact that the generator is idle except when supplied with liquid to be vaporized, make it quite feasible to utilize two or more generators in heat-exchange relationship to the same heat-storage medium, each generator being supplied and controlled (as in the manner below described) in accordance with the demands of the heater unit which it serves. Various other practical and advantageous applications of the invention to the needs of particular situations will suggest themselves. The details of the invention will be understood from the following description and the accompanying drawings of illustrative forms which the system may take.

In the drawings, which are largely diagrammatic:

Fig. 1 is a schematic, partially-sectioned view of a form of the invention applied to an existing house-heating installation;

Fig. 2 is a sectional view on the line II—II of Fig. 1;

Fig. 3 is a schematic, partially-sectioned view of a preferred form of unitary installation, the sectioning being on the line III—III of Fig. 4;

Fig. 4 is a sectional view on the line IV—IV of Fig. 3;

Fig. 5 is an enlarged sectional view of a control valve; and

Fig. 6 is an elevational view of an alternative form of generator.

Referring first to the form of the invention shown in Figs. 1 and 2, there is diagrammatically illustrated a typical domestic furnace unit generally designated 1 arranged to be heated as by an electrically driven oil burner 2. Adjacent the furnace is a two-compartment tank 3 of which the upper compartment 4 is coupled to the furnace boiler by upper and lower connections 5 and 6. An expansion tank is indicated at 7 and a safety or blow-off valve at 8.

The boiler and compartment 4 are filled with a suitable heat-storage medium such, for example, as ethylene glycol and this entire body of heat-storage medium is maintained at a predetermined minimum temperature, as by a so-called aquastat 9 responsive to the temperature of the medium and controlling the motor circuit of the burner 2. This minimum temperature is maintained without regard to the demands upon the system.

Immersed in the heat-storage medium in compartment 4 is a generator, generally designated 10, shown in this instance as comprising a shell having an inlet 11 at its lower end and an outlet 12 at its upper end and traversed by a series of open-ended tubes 13. By such means the interior of the shell is maintained substantially at the temperature of the heat-storage medium.

The lower compartment or sump 14 of tank 3 constitutes a source of supply of a liquid adapted to vaporize at a temperature less than that at which the heat-storage medium is maintained. Such liquid may conveniently be water, in which event the heat-storage medium will be maintained at a temperature greater than 212° F., say around 250° F.

An electrically driven feed pump, diagrammatically indicated at 15, has its suction or inlet side connected to the liquid supply source as by a pipe 16 extending down into the liquid in compartment 14; and the discharge or outlet side of the pump is connected to generator inlet 11. The generator outlet 12 is connected by a vapor line 17 with a radiator 18 and a condensate return line 19 is connected from the far end of the radiator back to the compartment 14.

The electrically operated pump 15 is intermittently operated in accordance with the demands upon the system, as by means of a room thermostat 20 located in the space heated by radiator 18. An auxiliary aquastat 21 may be incorporated in the system and arranged to break the circuit of pump 15 if for any reason the temperature of the heat-storage medium should fall below the predetermined minimum.

It will be understood that the generator shell is normally empty but in immediate response to a call for heat by the room thermostat 20 the pump 15 is started and liquid from the supply source 14 is forced into the generator, where it vaporizes at once, due to the high maintained temperature of the generator, and passes to the radiator 18. There is thus virtually no lag whatsoever between the call for heat and the supply of steam or other vapor to the radiator. Similarly, the supply of liquid to the generator is stopped in immediate response to the opening of room thermostat 20, with the result that there is virtually no overheating of the room or space in which radiator 18 is located. In the result, extremely close control over the temperature can be readily maintained. It will also be understood, of course, that the capacities of the pump, generator, storage medium and burner or other heating means are correlated to effect a flow through the generator from the inlet toward the outlet and also to insure the discharge of substantially vapor only to the generator outlet when the pump is in operation, but since these are design details within the skill of any competent heating engineer, no further description will be necessary. It will be noted that by reason of the location of the compartment or sump 14 at a low level with respect to the other elements of the system, it is not essential to elevate the radiator as indicated and as is ordinarily necessary in other systems. As will be seen, it is only required that the radiator be at a sufficient height above the level maintained in the sump 14 to permit condensate to drain back into the sump.

In the form illustrated in Figs. 3, 4 and 5 of the drawings, the invention is diagrammatically illustrated as incorporated in a convenient furnace unit rather than installed as an adjunct to an existing furnace.

As shown in Figs. 3 and 4, the base of the unit comprises a sump or tank 22 which corresponds to the compartment 14 and serves as the source of supply of the liquid to be vaporized. The boiler elements and heating means are superimposed on the sump 22 and are indicated as including a firebox 23 into which projects a burner 24. The products of combustion are led through a circuitous path, as by baffles 25, to a stack outlet 26. As indicated in Fig. 4, the combustion gas flues 27 are arranged on each side of a centrally located heat-storage medium tank 28.

Immersed in the tank 28 is a generator generally designated 29 in Figs. 3 and 4 where for convenience and to avoid encumbering the illustration it is indicated merely by a dotted rectangular outline with an inlet 30 adjacent a lower corner and an outlet 31 adjacent an upper corner. The generator outlet 31 is connected to a condensate trap or chamber 33 which is in turn connected by vapor line 34 to radiator 35. An air valve 36 is shown mounted on the far end of the radiator. As will be understood, the generator may be variously constructed to provide for the rapid generation of vapor as above described. In Fig. 6 one alternative construction to that already described is illustrated as consisting of a coiled tube or conduit 29' having an inlet 30' at its lower end and an outlet 31' at its upper end and providing an extended, circuitous path for vapor generation. Also, as shown, the coil is of enlarged cross-section adjacent its outlet end, preferably being of increasing diameter throughout its length, so as to permit of some vapor expansion and pressure reduction at such outlet end.

As before, the generator is supplied by an electrically driven feed pump generally designated 37 and started and stopped by a room thermostat 37', but in this instance a control valve shown in enlarged section in Fig. 5 and generally designated 38 is interposed in the liquid supply and condensate return lines.

As shown in Fig. 5, valve 38 includes a liquid inlet 39 and a liquid outlet 40, the latter communicating with upper and lower branch ports 41 and 42. These ports are controlled by a piston member 43 adjustably loaded by spring 44 and screw 45 so that in its lower or at rest position the piston member obstructs port 42 but uncovers port 41. In this position of the piston member 43 port 41 is in communication with passage 46 and with discharge outlet 47. Outlet 40 is connected through pipe 48 (Fig. 3) with the generator inlet 30 and valve discharge outlet 47 is connected by pipe 49 to drain back into the sump 22, the generator being thereby emptied whenever the apparatus is at rest. In Fig. 3 pipe 49 is shown connected to the upper end of a drain pipe 50 within which depends a smaller pipe 51 which supplies liquid to the inlet side of the pump 37 and from the outlet side of the pump through pipe 52 to the valve inlet 39. The loading of piston member 43 is so adjusted that during normal operation of pump 37 the liquid pressure elevates the piston member to its dotted line position, thereby closing port 41 and uncovering port 42 through which latter the liquid is supplied to outlet 40, pipe 48 and inlet 30 to the generator.

A condensate return pipe 53 leads from the bottom of chamber 33 to an inlet 54 in valve 38 thereby providing for the return of any condensate trapped in chamber 33 to the interior of valve 38. The return of such condensate to the sump 22 by way of inlet 54, passage 46 and discharge outlet 47 is obstructed by piston member 43 during normal operation of the pump but an alternative return passage 55, 56 is provided. This passage in turn is controlled by a thermostatically controlled valve 57, indicated as being of the bellows type, which is set to close in response to any flow of vapor through the passage 55, 56 but to open to permit the flow of condensate.

As shown in Figs. 3 and 4, the condensate return pipe 50 and the liquid supply pipe 51 are set into the sump within an enclosure 58 perforated, as at 59, at its lower end. As will be understood the enclosure serves as a reservoir for the warmer condensate and insures its immediate supply to the generator when the pump is started.

As before, the heat-storage medium is maintained at the required predetermined minimum temperature by an aquastat 60 (Fig. 3) which controls the heating means or burner 24; and, except as already indicated, the operation of the system is the same as that first above described.

In the light of the foregoing description the following is claimed.

1. In an apparatus of the character described, the combination of sump tank, a heat-storage medium tank mounted above the same, a heat-storage medium in said latter tank and heating means therefor, medium temperature responsive means for actuating said heating means to maintain said medium at a predetermined minimum temperature, a body of liquid in the sump tank of a character such as to vaporize at a temperature below the said predetermined minimum, conduit means in heat exchange relation to the heat-storage medium and arranged to drain toward the sump tank, a condensate trap having a connection with the discharge end of said conduit means, a condensate return line from the trap to the sump tank, and a pump adapted to raise liquid from the sump tank and force the same into the conduit means.

2. In an apparatus of the character described, the combination of sump tank, a heat-storage medium tank mounted above the same, a heat-storage medium in said latter tank and heating means therefor, medium temperature responsive means for actuating said heating means to maintain said medium at a predetermined minimum temperature, a body of liquid in the sump tank of a character such as to vaporize at a temperature below the said predetermined minimum, conduit means in heat exchange relation to the heat-storage medium and arranged to drain toward the sump tank, a condensate trap having a connection with the discharge end of said conduit means, a condensate return line from the trap in the sump tank, means in the return line for restraining vapor flow therethrough, and a pump adapted to raise liquid from the sump tank and force the same into the conduit means.

3. In a heating system the combination of a heat-storage medium and heating means therefor, medium temperature responsive means for actuating said heating means to maintain said medium at a predetermined minimum teperature; a generator in heat-exchange relationship to said medium and having an inlet and an outlet spaced therefrom; a supply source of a liquid adapted to vaporize at a temperature less than said predetermined minimum temperature; a feed pump and a motor for intermittently operating the same; connections from the suction side of the pump to said liquid supply source and from the discharge side of the pump to the generator inlet; space temperature responsive means for intermittently actuating said motor whereby liquid is supplied to the generator by the pump in immediate response to operation of the motor, the generator outlet being adapted to supply vaporized liquid to maintain a predetermined temperature in said space; and the capacities of the pump, generator, storage medium and heating means being correlated to effect a flow through the generator from the inlet toward the outlet and the discharge substantially vapor only at the said outlet when the pump is in operation.

4. In a heating system, the combination of a liquid heat-storage medium and heating means therefor, medium temperature responsive means for actuating said heating means to maintain said medium at a predetermined minimum temperature; a generator in heat-exchange relationship to said medium and having an inlet and an outlet spaced therefrom: a supply source of a liquid adapted to vaporize at a temperature less than said predetermined minimum temperature; a feed pump and a motor for intermittently operating the same; connections from the suction side of the pump to said liquid supply source and from the discharge side of the pump to the generator inlet; space temperature responsive means for intermittently actuating said motor, whereby liquid from said source is supplied to the generator by the pump in immediate response to operation of the motor, the generator outlet being adapted to supply vaporized liquid to maintain a predetermined temperature in said space; a second medium temperature responsive means for inactuating said motor whenever the temperature of said medium falls below said predetermined minimum temperature; and the capacitites of the pump, generator, storage medium and heating means being correlated to effect a flow through the generator from the inlet toward the outlet and the discharge of substantially vapor only at the said outlet when the pump is in operation.

5. In a heating system the combination of a heat-storage medium and heating means for maintaining said medium at a predetermined minimum temperature; normally-empty conduit means in heat-exchange relationship to said medium and having an inlet and an outlet spaced therefrom; a supply source of a liquid adapted to vaporize at a temperature less than said predetermined minimum temperature; a feed pump and a motor for intermittently operating the same; connections from the suction side of the pump to said liquid supply source and from the discharge side of the pump to the said inlet; space temperature responsive means for intermittently actuating said motor, whereby liquid is supplied to the conduit means by the pump in immediate response to operation of the motor, the said outlet being adapted to supply vaporized liquid to said space to maintain a predetermined temperature therein; a return line adapted to pass condensed liquid from said space to said liquid supply source; said conduit means being adapted to drain into the liquid supply source; and the capacities of the pump, conduit means, storage medium and heating means being correlated to effect a flow through the conduit means from the inlet toward the outlet and the discharge of substantially vapor only at the said outlet when the pump is in operation.

6. In a heating system, the combination of a heat-storage medium and heating means therefor, medium temperature responsive means for actuating said heating means to maintain said medium at a predetermined minimum temperature, and an expansion vessel for said medium; a generator coil in heat-exchange relationship to said medium, and having an inlet at one end and an outlet at its other end and being of increasing internal diameter from the inlet end toward the outlet end; a supply source of a liquid adapted to vaporize at a temperature less than said predetermined minimum temperature; a feed pump and a motor for intermittently operating the same; connections from the suction side of the pump to said liquid supply source and from the discharge side of the pump to the coil inlet; space temperature responsive means for intermittently actuating said motor, whereby liquid is supplied to the coil by the pump in immediate response to operation of the motor, the coil outlet being adapted to supply vaporized liquid to maintain a predetermined temperature in said space; said generator coil being positioned to drain into said liquid supply source when the pump is not in operation; and the capacities of the pump, coil, storage medium and heating means being correlated to effect a flow through the coil from the inlet toward the outlet and the discharge of substantially vapor only at the said outlet when the pump is in operation.

7. A furnace unit comprising a sump tank in the lower portion thereof, heating means mounted above said sump tank, a heat-storage medium tank mounted above the heating means and adapted to be heated thereby, means for maintaining a heat-storage medium in the latter tank at a predetermined minimum temperature, conduit means in said medium tank in heat exchange relation to the heat-storage medium and having an inlet connected with said sump tank, a body of liquid in the sump tank of a character such as to vaporize at a temperature below the said predetermined minimum, a pump adapted to raise liquid from the sump tank and force the same into the conduit means, a vapor outlet for said conduit means, a condensate trap above said medium tank to which said vapor outlet is connected, and a return line from said trap to the sump tank.

8. A furnace unit comprising a sump tank in the lower portion thereof, heating means mounted above said sump tank, a heat-storage medium tank mounted above the heating means and adapted to be heated thereby, means for maintaining a heat-storage medium in the latter tank at a predetermined minimum temperature, conduit means in said medium tank in heat exchange relation to the heat-storage medium and having an inlet connected with said sump tank, a body of liquid in the sump tank of a character such as to vaporize at a temperature below the said predetermined minimum, a pump adapted to raise liquid from the sump tank and force the same into the conduit means, a vapor outlet for said conduit means, a condensate trap above said medium tank to which said vapor outlet is connected, a return line from said trap to the sump tank, and said sump tank having an enclosure therein in restricted communication with the rest of the sump tank and to which said inlet and return line are connected.

JOHN E. AYRES.

REFERENCES CITED

The following references are of record in the file of this patent:

UNITED STATES PATENTS

| Number | Name | Date |
|---|---|---|
| 12,682 | Latta | Apr. 10, 1855 |
| 1,560,528 | Baum | Nov. 10, 1925 |
| 1,564,716 | Ruths | Dec. 8, 1925 |
| 1,983,218 | Dunham | Dec. 4, 1934 |
| 1,988,382 | Greene | Jan. 15, 1935 |
| 2,211,573 | McGrath | Aug. 13, 1940 |
| 2,316,417 | Gregg | Apr. 13, 1943 |

FOREIGN PATENTS

| Number | Country | Date |
|---|---|---|
| 11,704 | Great Britain | May 29, 1896 |
| 155,877 | Switzerland | Sept. 16, 1932 |
| 227,859 | Great Britain | Feb. 4, 1926 |